United States Patent
Nakagawa

(10) Patent No.: US 12,192,350 B2
(45) Date of Patent: Jan. 7, 2025

(54) INFORMATION PROCESSING APPARATUS AND CONTROL METHOD

(71) Applicant: SHARP KABUSHIKI KAISHA, Sakai (JP)

(72) Inventor: Kanji Nakagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 262 days.

(21) Appl. No.: 17/963,909

(22) Filed: Oct. 11, 2022

(65) Prior Publication Data

US 2023/0122687 A1    Apr. 20, 2023

(30) Foreign Application Priority Data

Oct. 14, 2021  (JP) .................................. 2021-169103

(51) Int. Cl.
G06F 21/00 (2013.01)
H04L 9/08 (2006.01)

(52) U.S. Cl.
CPC .................................. H04L 9/088 (2013.01)

(58) Field of Classification Search
CPC .............................. H04L 9/088; H04L 9/0897
See application file for complete search history.

(56) References Cited

U.S. PATENT DOCUMENTS

| | | | |
|---|---|---|---|
| 2008/0226081 A1 | 9/2008 | Terao | |
| 2014/0289537 A1* | 9/2014 | Parsons | G06F 21/575 713/193 |
| 2016/0259941 A1* | 9/2016 | Vasudevan | H04L 63/20 |
| 2021/0374265 A1* | 12/2021 | Gigov | H04L 63/0853 |
| 2022/0405354 A1* | 12/2022 | Sethi | G06F 21/121 |

FOREIGN PATENT DOCUMENTS

JP    2008236091 A    10/2008

* cited by examiner

*Primary Examiner* — William A Corum, Jr.
(74) *Attorney, Agent, or Firm* — ScienBiziP, P.C.

(57) ABSTRACT

An information processing apparatus includes: a first storage memory that stores data; a second storage memory that stores an encryption key; a controller that encrypts the first storage memory with the encryption key; and a communicator that communicates with a server device that stores the encryption key, wherein when the encryption key is acquirable from the server device via the communicator, the controller uses the encryption key acquired from the server device to decrypt the first storage memory, and when the encryption key is not acquirable from the server device via the communicator, the controller requests authentication and, after the authentication is performed, acquires the encryption key from the second storage memory and decrypts the first storage memory.

7 Claims, 19 Drawing Sheets

FIG. 3

| PARAMETER NAME | PARAMETER VALUE |
|---|---|
| COUNTER VALUE | 0 |
| IMPROPER INPUT COUNT | 0 |
| ⋮ | ⋮ |

FIG. 4

| IMPROPER INPUT COUNT | WAITING TIME |
|---|---|
| 0 | 0 SEC |
| 1 | 0.25 SEC |
| 2 | 0.5 SEC |
| 3 | 1 SEC |
| 4 | 2 SEC |
| ⋮ | ⋮ |
| 8 | 32 SEC |
| 9 | 64 SEC |
| 10 TIMES OR MORE | 24 HRS |

FIG. 6

| ENDORSEMENT PUBLIC KEY | STORAGE KEY |
|---|---|
| PubEK1 | 9D215EB90560C18D... |
| PubEK2 | 40920DBA3001AEE2... |
| ⋮ | ⋮ |

FIG. 7

| PARAMETER NAME | PARAMETER VALUE |
|---|---|
| COUNTER VALUE | 1 |

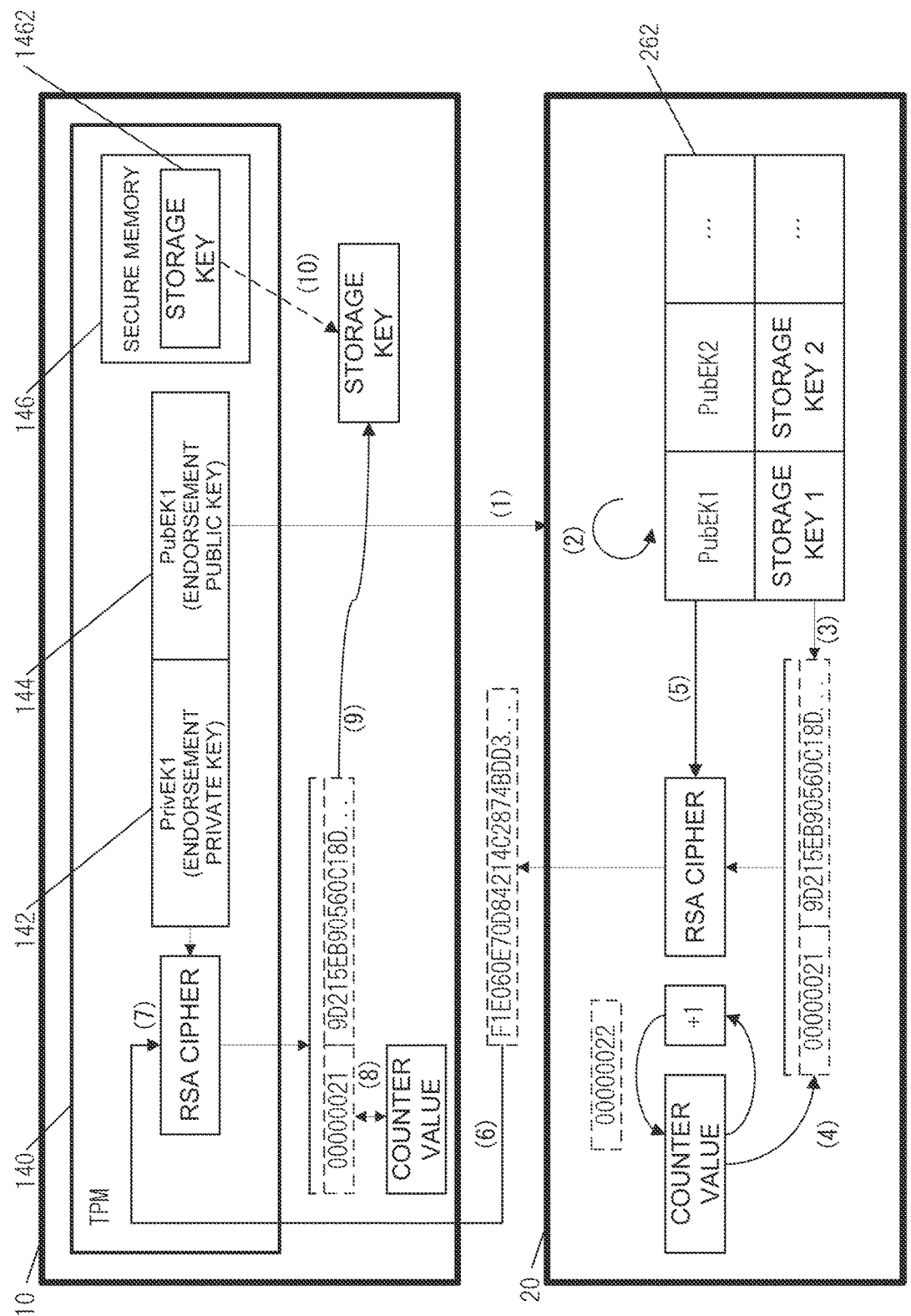

INFORMATION PROCESSING APPARATUS AND CONTROL METHOD

CROSS-REFERENCE TO RELATED APPLICATION

The present application claims priority from Japanese Application JP2021-169103, the content to which is hereby incorporated by reference into this application.

BACKGROUND OF THE INVENTION

1. Field of the Invention

The present disclosure relates to an information processing apparatus, and the like.

2. Description of the Related Art

In information processing apparatuses and multifunctional peripherals (e.g., image-forming apparatuses and image processing apparatuses) including an information processing apparatus, a storage (storage device, storage memory) is encrypted using a storage key (encryption key).

There are known techniques for acquiring and managing encryption keys. For example, there is a known technique in which a first encryption key stored in a secure memory inside an apparatus is used so that a second encryption key stored in a non-secure storage device is decrypted and is stored as a backup key outside the apparatus and, when the first encryption key is not usable, the backup key is used to decrypt the data encrypted with the second encryption key, and password input is required to use the backup key.

SUMMARY OF THE INVENTION

When the storage of the information processing apparatus is encrypted, security for the storage needs to be ensured, while the availability needs to be increased. Here, according to the conventional technique, the second encryption key is stored in the non-secure storage device and the storage is decrypted without inputting the password to use the encryption key at the time of power-on. Therefore, the measures are insufficient when the apparatus is stolen. Further, the conventional technique does not describe a case where the backup key stored outside the apparatus is not acquirable.

In view of the above-described issues, the present disclosure has an object to provide an information processing apparatus, and the like, which may securely acquire an encryption key even when the encryption key stored outside the apparatus is not acquirable.

In order to solve the above-described issue, an information processing apparatus according to the present disclosure includes a first storage memory that stores data; a second storage memory that stores an encryption key; a controller that encrypts the first storage memory with the encryption key; and a communicator that communicates with a server device that stores the encryption key, wherein when the encryption key is acquirable from the server device via the communicator, the controller uses the encryption key acquired from the server device to decrypt the first storage memory, and when the encryption key is not acquirable from the server device via the communicator, the controller requests authentication and, after the authentication is performed, acquires the encryption key from the second storage memory and decrypts the first storage memory.

A control method according to the present disclosure is a control method for an apparatus including a first storage memory that stores data and a second storage memory that stores an encryption key, and the control method includes encrypting the first storage memory with the encryption key, communicating with a server device that stores the encryption key, and when the encryption key is acquirable from the server device that stores the encryption key, using the encryption key acquired from the server device to decrypt the first storage memory and, when the encryption key is not acquirable from the server device, requesting authentication and, after the authentication is performed, acquiring the encryption key from the second storage memory and decrypting the first storage memory.

According to the present disclosure, it is possible to provide an information processing apparatus, and the like, which may securely acquire the encryption key even when the encryption key stored outside the apparatus is not acquirable.

BRIEF DESCRIPTION OF THE DRAWINGS

FIG. 3 is a table illustrating an example of a parameter table of the information processing apparatus according to the first embodiment.

FIG. 4 is a table illustrating an example of a waiting time table according to the first embodiment.

FIG. 6 is a table illustrating a data structure of storage key information according to the first embodiment.

FIG. 7 is a table illustrating an example of a parameter table of the server device according to the first embodiment.

FIG. 13 is a diagram illustrating an operation example according to the first embodiment.

DETAILED DESCRIPTION OF THE INVENTION

An embodiment for carrying out the present disclosure will be described below with reference to the drawings. The embodiment below is an example for describing the present disclosure, and the technical scope of the disclosure set forth in the claims is not limited to the description below.

1. First Embodiment 1.1 Overall Configuration

Figure 1:
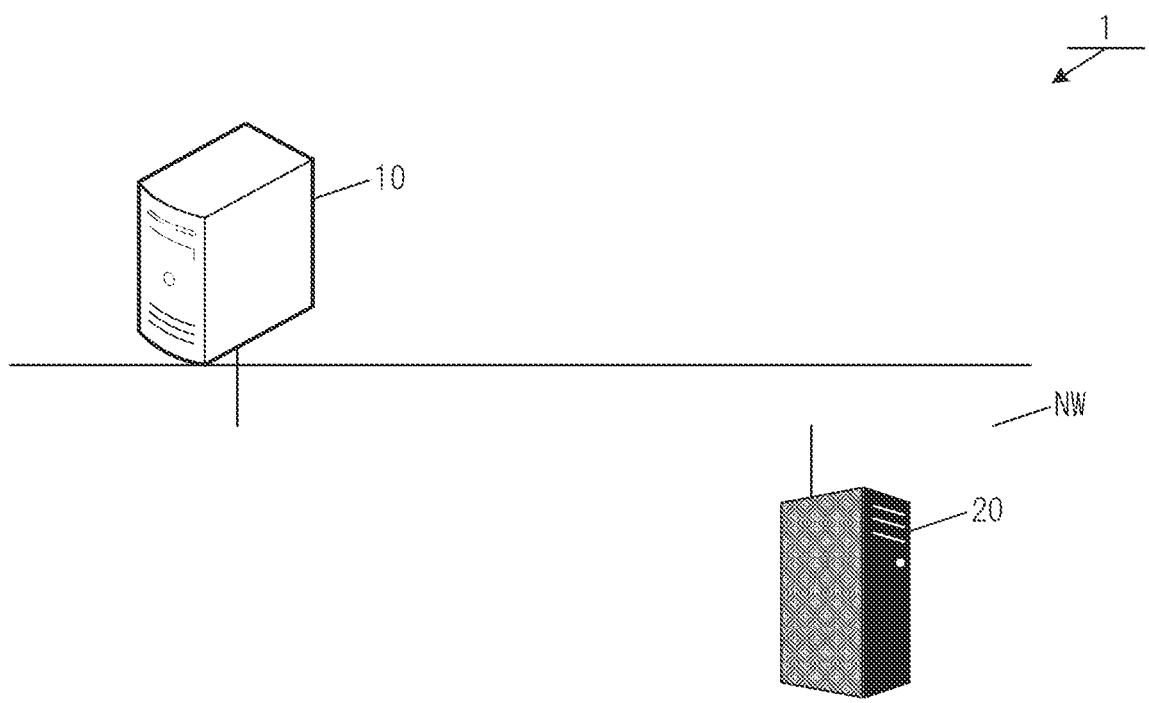
FIG. 1 is a diagram illustrating an overall configuration of a system according to a first embodiment.

With reference to FIG. 1, a system 1 according to the present embodiment will be described. As illustrated in FIG. 1, the system 1 according to the present embodiment includes an information processing apparatus 10 and a server device 20. The information processing apparatus 10 and the server device 20 are connected via a network NW. The network NW may be any network, such as a local area network (LAN), a wide area network (WAN), or the Internet (external network) as long as devices may exchange information with each other. Various server devices such as file servers and authentication servers, terminal devices, and devices such as network devices may also be connected to the network NW.

The information processing apparatus 10 is a computer (information processing apparatus) such as a personal computer (PC), which is a device used by a user, and may be any apparatus as long as the apparatus includes a computer. For example, the information processing apparatus 10 may be a digital multifunction peripheral/printer (MFP), such as an image processing apparatus or an image-forming apparatus, an automated teller machine, or a machine tool.

The server device 20 is an information processing apparatus that provides a service. According to the present embodiment, as an example of the service, the server device 20 provides the service to manage (store) a storage key of the information processing apparatus 10 and send the managed storage key to the information processing apparatus 10 in response to the inquiry for the storage key from the information processing apparatus 10. The storage key is data on the key (encryption key) used to encrypt or decrypt (decode) the storage (storage device) of the information processing apparatus 10. The server device 20 is also referred to as a key server. The server device 20 is installed in a server room, or the like, while protected from thieves.

1.2 Functional Configuration 1.2.1 Information Processing Apparatus

Figure 2:
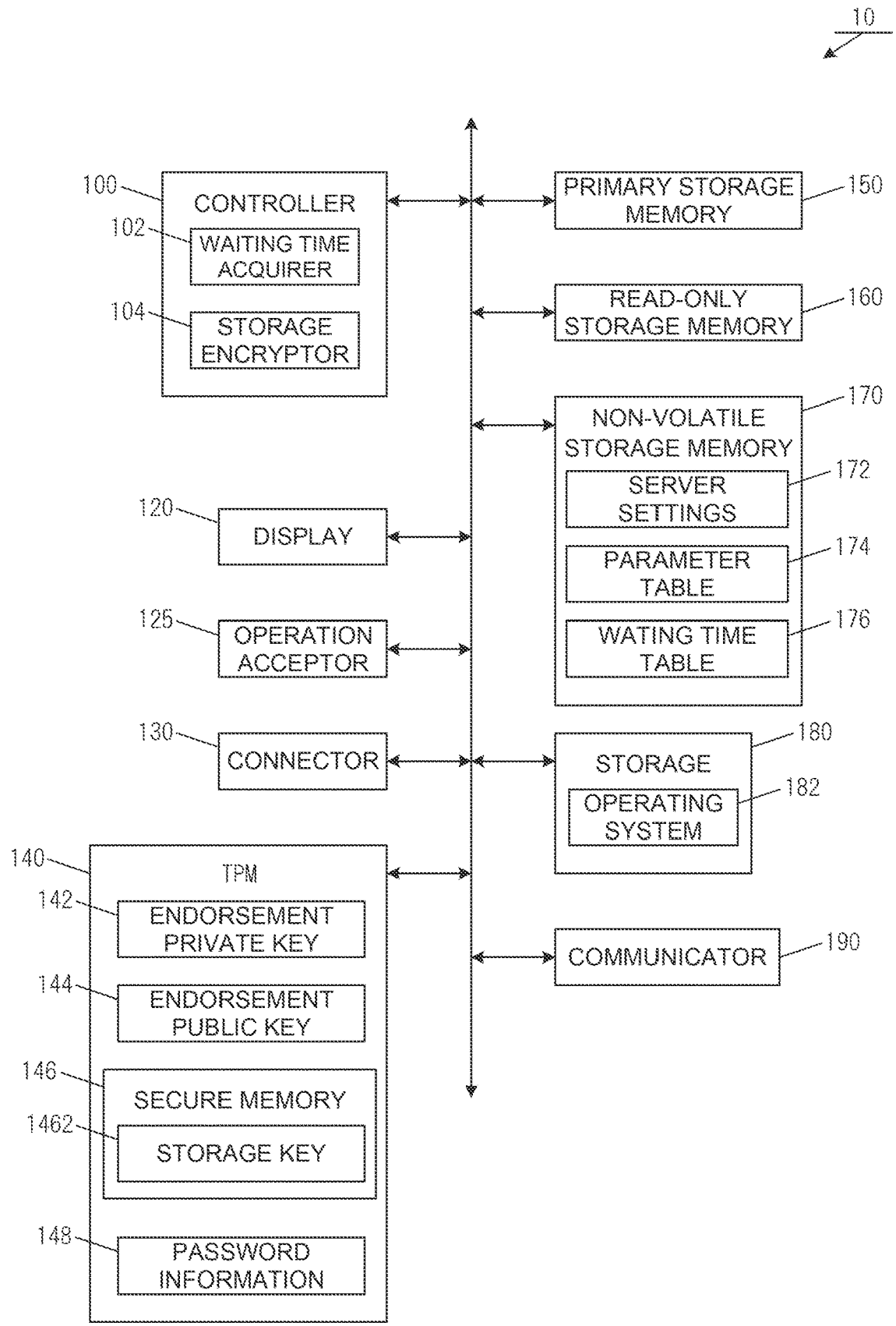
FIG. 2 is a diagram illustrating a functional configuration of an information processing apparatus according to the first embodiment.

With reference to FIG. 2, a functional configuration of the information processing apparatus 10 will be described. As illustrated in FIG. 2, the information processing apparatus 10 includes a controller 100, a display 120, an operation acceptor 125, a connector 130, a Trusted Platform Module (TPM) 140, a primary storage memory 150, a read-only storage memory 160, a non-volatile storage memory 170, a storage 180, and a communicator 190.

The controller 100 is a functional unit that controls the overall information processing apparatus 10. The controller 100 reads and executes various programs stored in the read-only storage memory 160 or the storage 180 to perform various functions and includes one or more arithmetic devices (e.g., central processing units (CPUs)). The controller 100 may be configured as a system on a chip (SoC) having a plurality of functions among the functions described below.

The controller 100 reads the program stored in the read-only storage memory 160 to perform functions as a waiting time acquirer 102 and a storage encryptor 104.

The waiting time acquirer 102 acquires the waiting time before the process is performed to determine whether the password input by the user is right or wrong. For example, the waiting time acquirer 102 acquires, from a waiting time table 176, the waiting time corresponding to an improper input count described below. The waiting time acquirer 102 may previously define the formula for calculating the waiting time and substitute the improper input count into the formula to calculate (acquire) the waiting time.

The storage encryptor 104 uses the storage key to encrypt and decrypt the storage 180.

The display 120 presents various types of information. The display 120 includes a display device such as a liquid crystal display (LCD), an organic electro-luminescence (EL) display, or a micro light emitting diode (LED) display.

The operation acceptor 125 accepts an operation of the user who uses the information processing apparatus 10. The operation acceptor 125 includes various operating devices such as a mouse and a keyboard.

The connector 130 establishes a connection with other devices such as an external storage device and a terminal device. The connector 130 includes a terminal such as a USB port.

The TPM 140 is a security module (security chip, semiconductor component) that performs various security functions and includes a storage memory (secure memory) having desirable tamper-resistance. The TPM 140 may be included in the information processing apparatus 10 as a chip independent of the controller 100 or may be built in the controller 100. The controller 100 may also have a TPM function.

The TPM 140 performs, as a security function, the function (cipher) to execute encryption and decryption using a public-key cryptosystem (e.g., RSA or DSA). The public-key cryptosystem (e.g., RSA cryptography) is a method for executing encryption and decryption using two encryption keys (key pair). One of the key pair is called a private key and is strictly controlled to prevent leakage. The other one of the key pair is called a public key and is passed to the communication partner in advance. The sender of the secret information encrypts the secret information with the public key of the recipient of the secret information and sends the resulting cipher text to the recipient. The recipient decrypts the cipher text received from the sender with its own private key. This allows the recipient to decode the secret information owned by the sender. In the description according to the present embodiment, it is assumed that the TPM 140 encrypts and decrypts information by using RSA cryptography among the public-key cryptosystems.

The TPM 140 according to the present embodiment stores an endorsement key as a key pair used for the public-key cryptosystem. The key pair is an endorsement private key 142 and an endorsement public key 144. The endorsement key is an RSA 2048-bit key pair that is written (embedded) at the time of manufacturing of the TPM 140. Therefore, the endorsement key is different for the individual TPM 140. The RSA cryptography is a cryptosystem that encrypts information with the public key of the key pair and decrypts the encrypted information with the private key. As there is no way to read or take out the endorsement private key 142 from the TPM 140, the data encrypted with the endorsement public key 144 may be correctly decrypted only by the TPM 140 to which the endorsement private key 142, which makes a pair with the endorsement public key, has been written.

The TPM 140 includes a secure memory 146 as a storage memory (storage area) that stores data. The secure memory 146 according to the present embodiment stores a storage key 1462 used for encrypting and decrypting the storage 180 described below. The secure memory 146 is a secure storage memory (storage area). For example, the secure memory 146 protects data by encryption, etc., and requires authentication such as a password to read the data. In this manner, the storage key 1462 is strictly managed in the information processing apparatus 10.

Password information 148 is information based on the password set for the TPM 140 and is used when the data stored in the secure memory 146 is read, etc. The password information 148 stores a password previously set by the user, a hash value of the password, and a key derived based on the password. The password information 148 may store additional information about the password.

The primary storage memory 150 is what is called a random access memory (RAM) and is a storage device (storage module) that may be read and written by the controller 100.

The read-only storage memory 160 is what is called a read only memory (ROM) and is a storage device (storage module) that may only read out the stored data.

The non-volatile storage memory 170 is a non-volatile memory (storage module) and includes, for example, an electrically erasable programmable read-only memory (EE-PROM).

The non-volatile storage memory 170 stores various setting values of the information processing apparatus 10. For example, the non-volatile storage memory 170 stores server settings 172, a parameter table 174, and a waiting time table 176.

The server settings 172 are information about the server device 20, for example, the information about the server device 20 itself such as the name (key server name) of the server device 20 and the information needed for communications of the server device 20 such as the Internet Protocol (IP) Address and the port number.

The parameter table 174 is a table that stores parameters of the information processing apparatus 10. For example, as illustrated in FIG. 3, the parameter table 174 is a table of the data associating a parameter name with a parameter value. According to the present embodiment, the parameter table 174 stores the parameter value (e.g., "0") for the counter value and the parameter value (e.g., "0") for the improper input count. The counter value of the information processing apparatus 10 is an integer value used for verifying the authenticity of the information received from the server device 20. The counter value of the information processing apparatus 10 is, for example, a sequential number whose initial value is 0. The improper input count is an integer value indicating the improper input count of the password used for reading the data stored in the secure memory 146, and its initial value is 0.

As illustrated in FIG. 4, the waiting time table 176 is a table associating the improper input count (e.g., "0") with the waiting time (e.g., "0 seconds").

The storage 180 is a storage device (storage module) that stores various programs including control programs needed for the operation of the information processing apparatus 10 and various types of data. The storage 180 is what is called an auxiliary storage device and includes storage devices such as solid state drive (SSD), which is a semiconductor memory, and a hard disk drive (HDD).

The storage 180 stores an operating system 182, etc. In order to read the operating system 182 stored in the encrypted storage 180, the storage 180 needs to be decrypted. The storage key 1462 is needed to encrypt or decrypt the storage 180.

The communicator 190 communicates with an external device such as the server device 20. The communicator 190 includes, for example, a communication device such as a network interface card (NIC), communication module, LAN adapter, etc., used in a wired/wireless LAN.

1.2.2 Server Device

Figure 5:
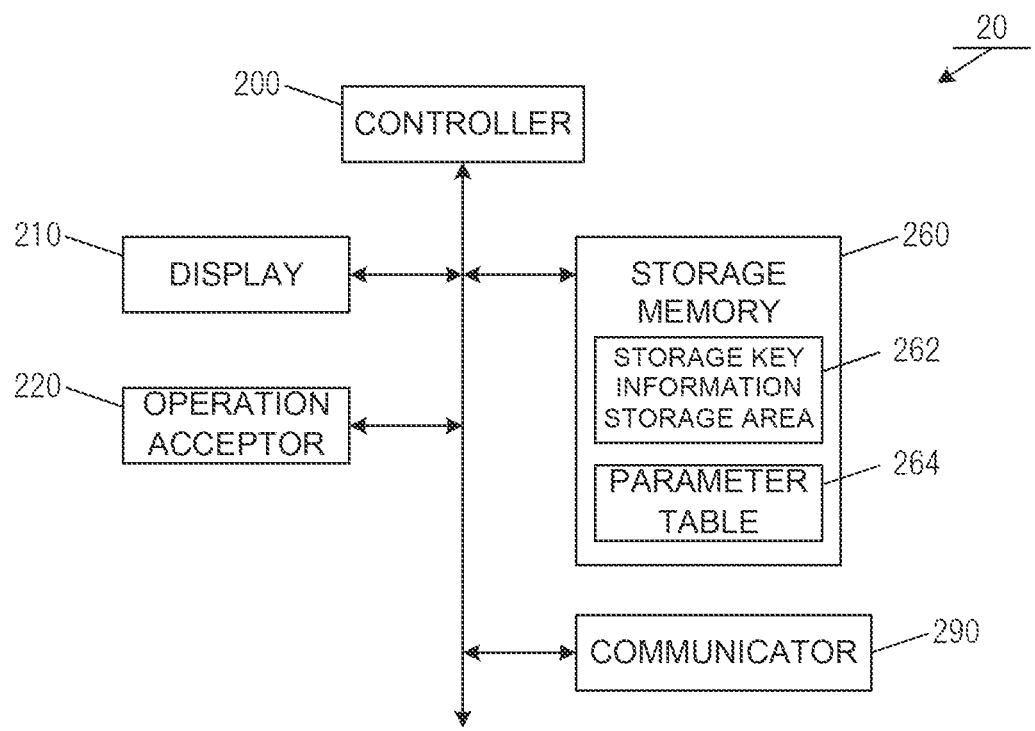
FIG. 5 is a diagram illustrating a functional configuration of a server device according to the first embodiment.

With reference to FIG. 5, a functional configuration of the server device 20 will be described. As illustrated in FIG. 5, the server device 20 includes a controller 200, a display 210, an operation acceptor 220, a storage memory 260, and a communicator 290.

The controller 200 is a functional unit that controls the overall server device 20. The controller 200 reads and executes various programs stored in the storage memory 260 to perform various functions and includes one or more arithmetic devices (e.g., CPUs). The controller 200 may be configured as a system on a chip (SoC) having a plurality of functions among the functions described below.

The display 210 presents various types of information. The display 210 includes, for example, a display device such as an LCD, an organic EL display, or a micro LED display. The operation acceptor 220 accepts operations of the user who uses the server device 20. The operation acceptor 220 includes various operating devices such as a mouse and a keyboard.

The storage memory 260 is a storage device (storage module) that stores various programs including control programs needed for the operation of the server device 20 and various types of data. The storage memory 260 includes, for example, a storage device such as an SSD, which is a semiconductor memory, and an HDD.

As a storage area, the storage memory 260 allocates a storage key information storage area 262 and further stores a parameter table 264.

The storage key information storage area 262 stores information (storage key information) about the storage key. FIG. 6 is a table illustrating the storage key information stored in the storage key information storage area 262. For example, as illustrated in FIG. 6, the storage key information includes the endorsement public key (e.g., "PubEK1") and the corresponding storage key (e.g., "9D215EB90560C18D . . . ").

The storage key information is previously stored. The storage key information storage area 262 may be a database (key database). The server device 20 uses the storage key information storage area 262 to manage the storage key of the information processing apparatus 10.

The parameter table 264 is a table that stores parameters of the server device 20. For example, as illustrated in FIG. 7, the parameter table 264 is a table of the data associating a parameter name with a parameter value. According to the present embodiment, the parameter table 264 stores the parameter value (e.g., "1") of the counter value. The counter value of the server device 20 is an integer value used for verifying the authenticity of information sent by the server device 20 and is, for example, a sequential number whose initial value is 1.

The communicator 290 communicates with an external device such as the information processing apparatus 10. The communicator 290 includes, for example, a communication device such as NIC, communication module, LAN adapter, etc., used in a wired/wireless LAN.

The above-described functional configuration is an example, and necessary functional units may be added to the information processing apparatus 10 and the server device 20 as appropriate or unnecessary functional units may be omitted. For example, the connector 130 may be omitted from the information processing apparatus 10, and the display 210 or the operation acceptor 220 may be omitted from the server device 20.

1.3 Process Flow

A process flow according to the present embodiment will be described. It is assumed that the information processing apparatus 10 stores the information on the server device 20 as the server settings 172. Furthermore, it is assumed that the storage 180 (a first storage memory) has been encrypted and the secure memory 146 (a second storage memory) stores the storage key 1462 for decrypting the storage 180. Moreover, it is assumed that the server device 20 stores the storage key information in which the storage key 1462 of the information processing apparatus 10 is associated with the endorsement public key 144 of the information processing apparatus 10.

1.3.1 Information Processing Apparatus

Figure 8:
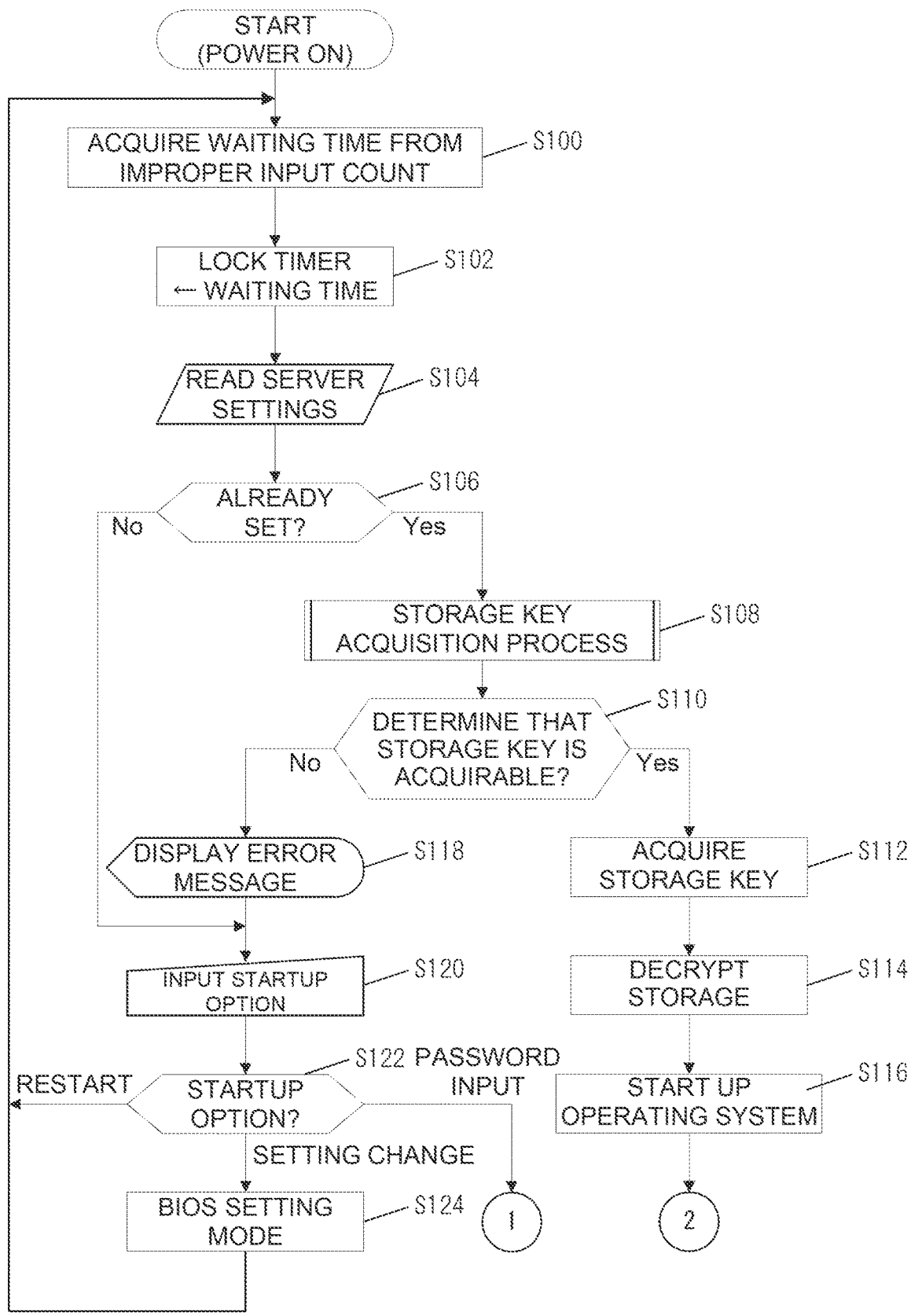
FIG. 8 is a flowchart illustrating a flow of a primary process of the information processing apparatus according to the first embodiment.
Figure 9:
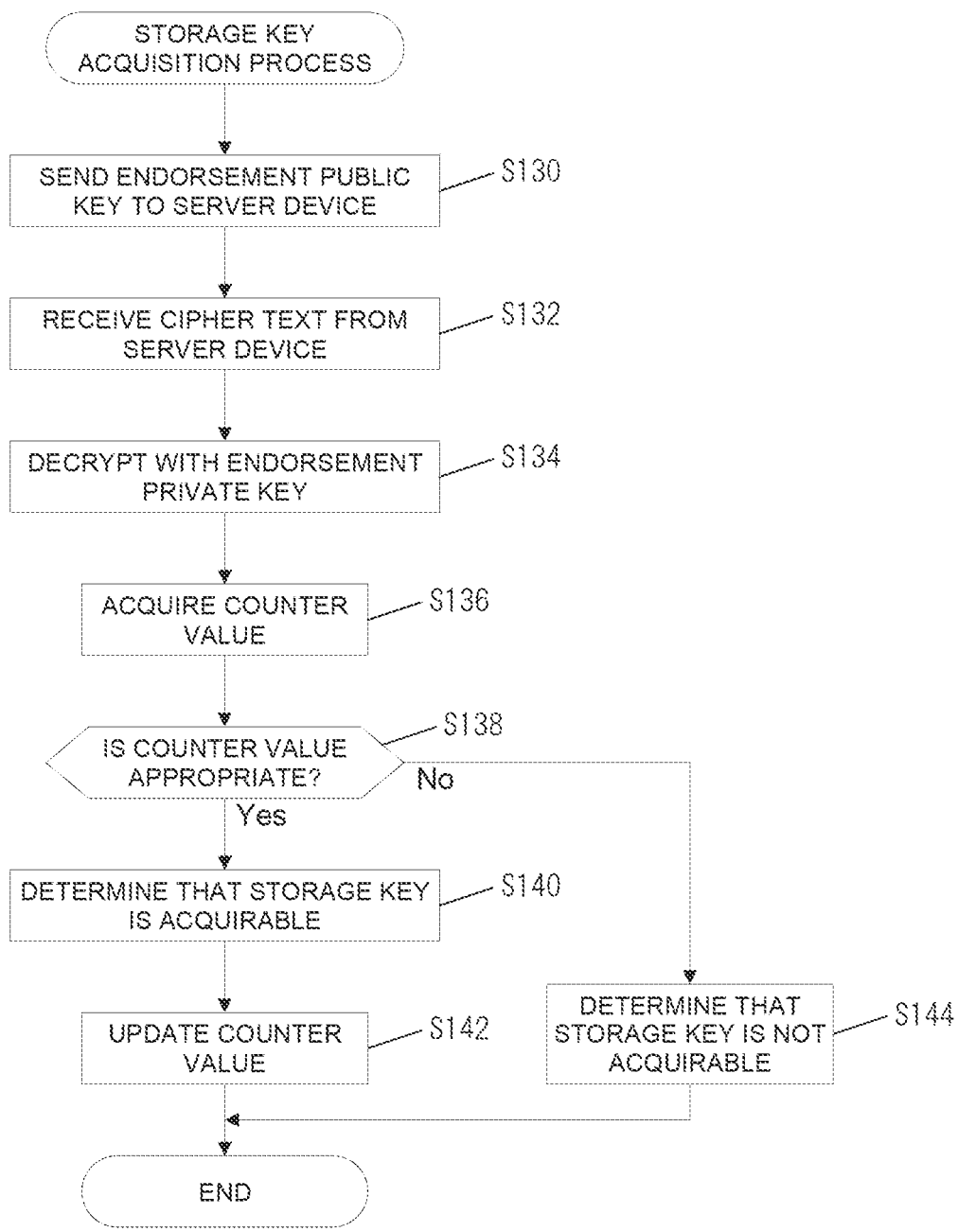
FIG. 9 is a flowchart illustrating a flow of a storage key acquisition process according to the first embodiment.
Figure 10:
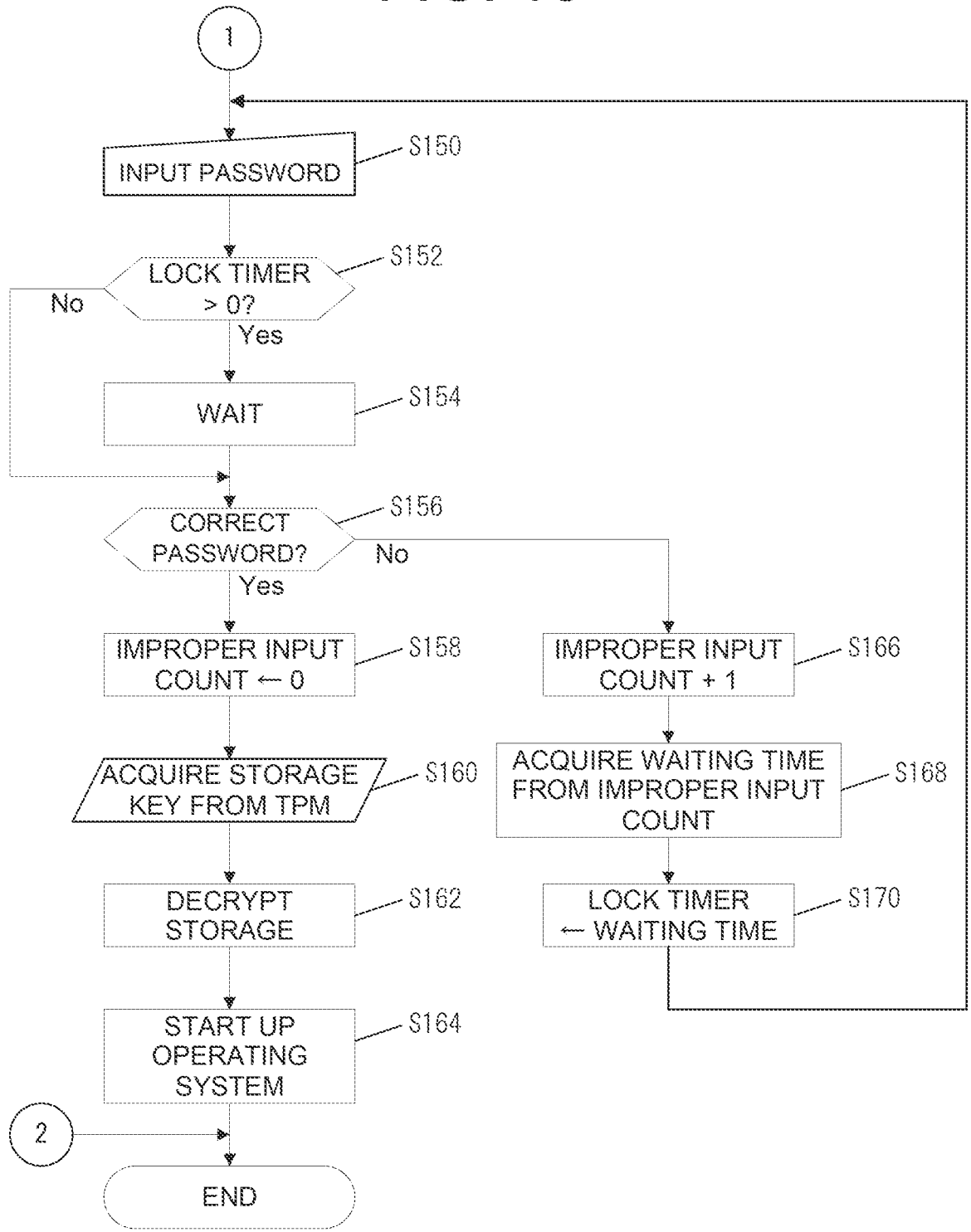
FIG. 10 is a flowchart illustrating a flow of a primary process of the information processing apparatus according to the first embodiment.

With reference to FIGS. 8 to 10, the flow of the primary process executed by the information processing apparatus 10 will be described. The processes illustrated in FIGS. 8 to 10 are executed by the controller 100 that reads the program stored in the read-only storage memory 160 when the power of the information processing apparatus 10 is turned on (at the time of power ON). That is, the processes in FIGS. 8 to 10 are the processes during the boot process of the information processing apparatus 10.

First, the process illustrated in FIG. 8 will be described. The controller 100 (the waiting time acquirer 102) acquires the waiting time based on the improper input count stored in the parameter table 174 (Step S100).

Subsequently, the controller 100 substitutes the waiting time acquired at Step S100 to a lock timer, operates the lock timer in parallel with the process illustrated in FIG. 8, and starts to count down the waiting time (Step S102).

Subsequently, the controller 100 reads the settings of the server device 20 and determines whether the settings of the server device 20 have been set (Step S104→Step S106). For example, the controller 100 determines that the settings have been set when the non-volatile storage memory 170 stores the server settings 172 and the server settings 172 include the information needed for a communication with the server device 20. Conversely, the controller 100 determines that the settings have not been set when the non-volatile storage memory 170 does not store the server settings 172 or the server settings 172 do not include the information needed for a communication with the server device 20.

When the settings of the server device 20 have been set, the controller 100 performs a storage key acquisition process to determine whether the storage key of the storage 180 is acquirable from the server device 20 (Step S106; Yes→Step S108). The storage key acquisition process will be described with reference to FIG. 9.

First, the controller 100 sends the endorsement public key 144 to the server device 20 via the communicator 190 (Step S130). At this time, the controller 100 may obtain the IP address of the server device 20 from the name of the server device 20 based on the information stored in the server settings 172.

Subsequently, the controller 100 receives the cipher text encrypted with the endorsement public key 144 from the server device 20 (Step S132). Furthermore, the controller 100 decrypts the cipher text received from the server device 20 by using the endorsement private key 142 via the TPM 140 (Step S134). According to the present embodiment, it is assumed that the cipher text sent from the server device 20 is information (e.g., character string) encrypting the counter value and the storage key.

Subsequently, the controller 100 acquires the counter value from the cipher text (plain text) decrypted at Step S134 (Step S136) and determines whether the counter value is appropriate (Step S138). For example, the controller 100 determines that the counter value acquired at Step S136 is appropriate when the counter value is more than the counter value stored in the parameter table 174, and otherwise determines that the counter value is not appropriate.

When the counter value is appropriate, the controller 100 determines that authentic information has been received from the server device 20 and that the storage key is acquirable from the server device 20 (Step S138; Yes→Step S140). In this case, the controller 100 substitutes the counter value acquired at Step S136 into the counter value stored in the parameter table 174 to update it (Step S142).

Conversely, when the counter value is not appropriate, the controller 100 determines that incorrect information has been received from the server device 20 and that the storage key is not acquirable from the server device 20 (Step S138; No→Step S144). In this case, the controller 100 may discard the received information without using it.

At Step S130, when there is no response from the server device 20, the controller 100 may retry sending the endorsement public key 144 to the server device 20. When there is no response from the server device 20 for a certain number of times, the controller 100 may cancel retry, determine that the communication with the server device 20 has not been properly executed, and terminate the process in FIG. 9. In this case, the controller 100 determines that the storage key is not acquirable from the server device 20.

With reference back to FIG. 8, the controller 100 determines whether the determination result of the storage key acquisition process indicates that the storage key is acquirable from the server device 20 (Step S110). When the storage key is acquirable from the server device 20, the controller 100 acquires the storage key based on the information received from the server device 20 (Step S110; Yes→Step S112). For example, the controller 100 acquires the storage key from the cipher text (plain text) decrypted at Step S134 of FIG. 9.

Subsequently, the controller 100 (the storage encryptor 104) decrypts the storage 180 by using the storage key acquired at Step S112 (Step S114). The controller 100 reads and executes the operating system 182 from the decrypted storage 180 to start up the operating system 182 (Step S116).

Conversely, when the storage key is not acquirable from the server device 20, the controller 100 presents, on the display 120, the error message indicating that the storage key is not acquirable from the server device 20 (Step S110; No→Step S118). Furthermore, the controller 100 presents, on the display 120, the screen for selecting a startup option for the information processing apparatus 10 and prompts the user to input the startup option (Step S120). It is assumed that three startup options below are selectable as a startup option.

Restart

Setting change

Password input

When the controller 100 determines at Step S106 that the settings of the server device 20 have not been set, the process at Step S120 is also executed (Step S106; No→Step S120).

Subsequently, the controller 100 determines the startup option input by the user (Step S122). When the startup option is restart, the controller 100 restarts the information processing apparatus 10 and executes the process from Step S100 again (Step S122; restart→Step S100). When the startup option is setting change, the controller 100 shifts to a basic input output system (BIOS) setting mode (Step S122; setting change→Step S124). In this case, the controller 100 presents a setting screen on the display 120. In the setting screen, the settings of the server device 20 may be changed. When the settings have been completed by the user, the controller 100 restarts the information processing apparatus 10 and executes the process from Step S100 again.

When the startup option is password input, the controller 100 executes the process to acquire the storage key with a password (Step S122; password input). Specifically, the controller 100 requests the user to conduct authentication to read the data in the secure memory 146.

The process of acquiring the storage key with the password will be described with reference to FIG. 10. First, the controller 100 presents, on the display 120, the screen for inputting the password used for reading the data stored in the secure memory 146 and requests the user to input the password (Step S150).

After the password is input by the user, the controller 100 determines whether the waiting time of the lock timer is more than 0 (Step S152). When the waiting time of the lock timer is more than 0, the controller 100 waits until the waiting time of the lock timer reaches 0 (Step S152; Yes→Step S154). When the waiting time of the lock timer is 0, the controller 100 omits the process at Step S154 (Step S152; No).

Subsequently, the controller 100 determines whether the password input at Step S150 is a correct password (Step S156). For example, the controller 100 determines that the input password is correct when the password input by the user matches the password stored in the password information 148.

When the password is correct, the controller 100 authenticates the user who has input the password as an authorized user of the information processing apparatus 10 and resets the parameter value of the improper input count of the parameter table 174 to 0 (Step S156; Yes→Step S158). The controller 100 acquires the storage key 1462 stored in the secure memory 146 of the TPM 140 (Step S160).

Subsequently, the controller 100 (the storage encryptor 104) decrypts the storage 180 by using the storage key 1462 acquired at Step S160 (Step S162). The controller 100 reads and executes the operating system 182 from the decrypted storage 180 to start up the operating system 182 (Step S164).

Conversely, when it is determined at Step S156 that the password is incorrect, the controller 100 increments the parameter value of the improper input count of the parameter table 174 by 1 (Step S156; No→Step S166). The controller 100 (the waiting time acquirer 102) acquires the waiting time based on the improper input count (Step S168). The controller 100 substitutes the acquired waiting time to the lock timer (Step S170). After performing the process at Step S170, the controller 100 returns to Step S150.

1.3.2 Server Device

Figure 11:
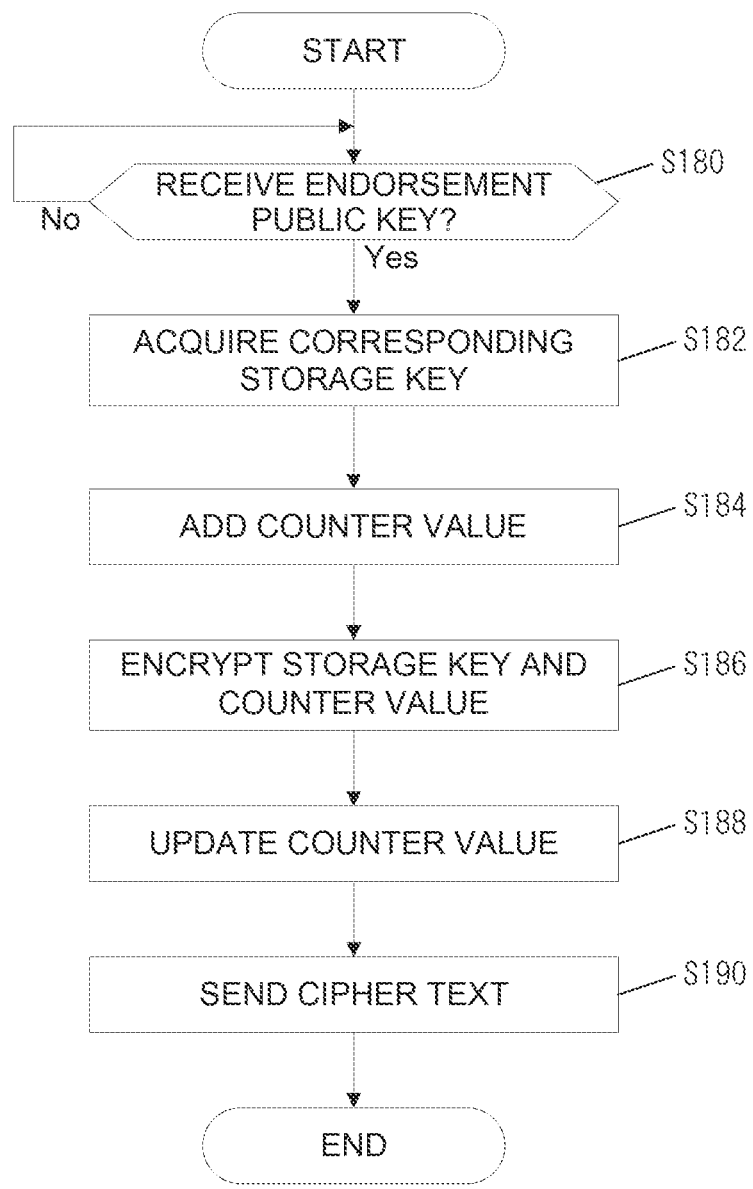
FIG. 11 is a flowchart illustrating a flow of a primary process of the server device according to the first embodiment.

With reference to FIG. 11, the primary process flow executed by the server device 20 will be described. The process illustrated in FIG. 11 is performed when the controller 200 of the server device 20 reads the program stored in the storage memory 260.

First, the controller 200 determines whether the endorsement public key has been received from another device via the communicator 290 (Step S180). When the endorsement public key has not been received from another device, the controller 200 repeatedly performs the process at Step S180 (Step S180; No).

When the endorsement public key has been received, the controller 200 reads the storage key information including the endorsement public key from the storage key information storage area 262 and acquires the storage key corresponding to the endorsement public key (Step S180; Yes→Step S182).

Subsequently, the controller 200 adds the counter value stored in the parameter table 264 to the storage key acquired at Step S182 (Step S184). Furthermore, the controller 200 implements the RSA cipher and encrypts the information (character string) on the storage key to which the counter value has been added (Step S186). At this time, the controller 200 performs encryption by using the endorsement public key received at Step S180 or the endorsement public key included in the storage key information read at Step S182.

Subsequently, the controller 200 stores the value obtained by incrementing the counter value acquired at Step S184 by 1 in the counter value in the parameter table 264 to update the counter value (Step S188). Furthermore, the controller 200 sends the cipher text generated at Step S186 to the information processing apparatus 10 that has sent the endorsement public key at Step S180 (Step S190).

The above-described process may be modified as needed. For example, the controller 100 may perform the process below at Step S156.

(1) Use of Password-Based Key Derivation Function

The controller 100 inputs the password input by the user as an argument to the password-based key derivation function (PBKDF) to derive the key based on the password.

(2) Use of Salt for Password-Based Key Derivation Function

The salt is a non-secret random value that is generated each time the password is set for the secure memory 146. When using the password-based key derivation function, the controller 100 inputs the salt together with the password as an argument to the password-based key derivation function. This allows the controller 100 to counter dictionary attacks.

(3) Key Stretching

When deriving the key from the password, etc., the controller 100 repeatedly applies a pseudo random function (PRF) including a cryptographic hash function, etc., not once but a large number of times (several thousand times or more) in the password-based key derivation function. That is, the controller 100 inputs the output of the PRF to the PRF again and repeatedly derives the key. This allows the controller 100 to improve resistance to brute-force attacks. The number of repetitions may be previously set or may be set by the user.

When the above-described process is performed, the password information 148 stores the information that may be compared with the information (e.g., the key derived using the password-based key derivation function) derived during the above process. For example, the password information 148 may include the information about the key derived by applying the password-based key derivation function one or more times or the information about the salt.

The controller 100 may also reset the improper input count to 0 when the continuous power-on time of the information processing apparatus 10 has exceeded 24 hours since the password was last improperly input.

1.4 Operation Example 1.4.1 Operation to Register Storage Key

Figure 12:
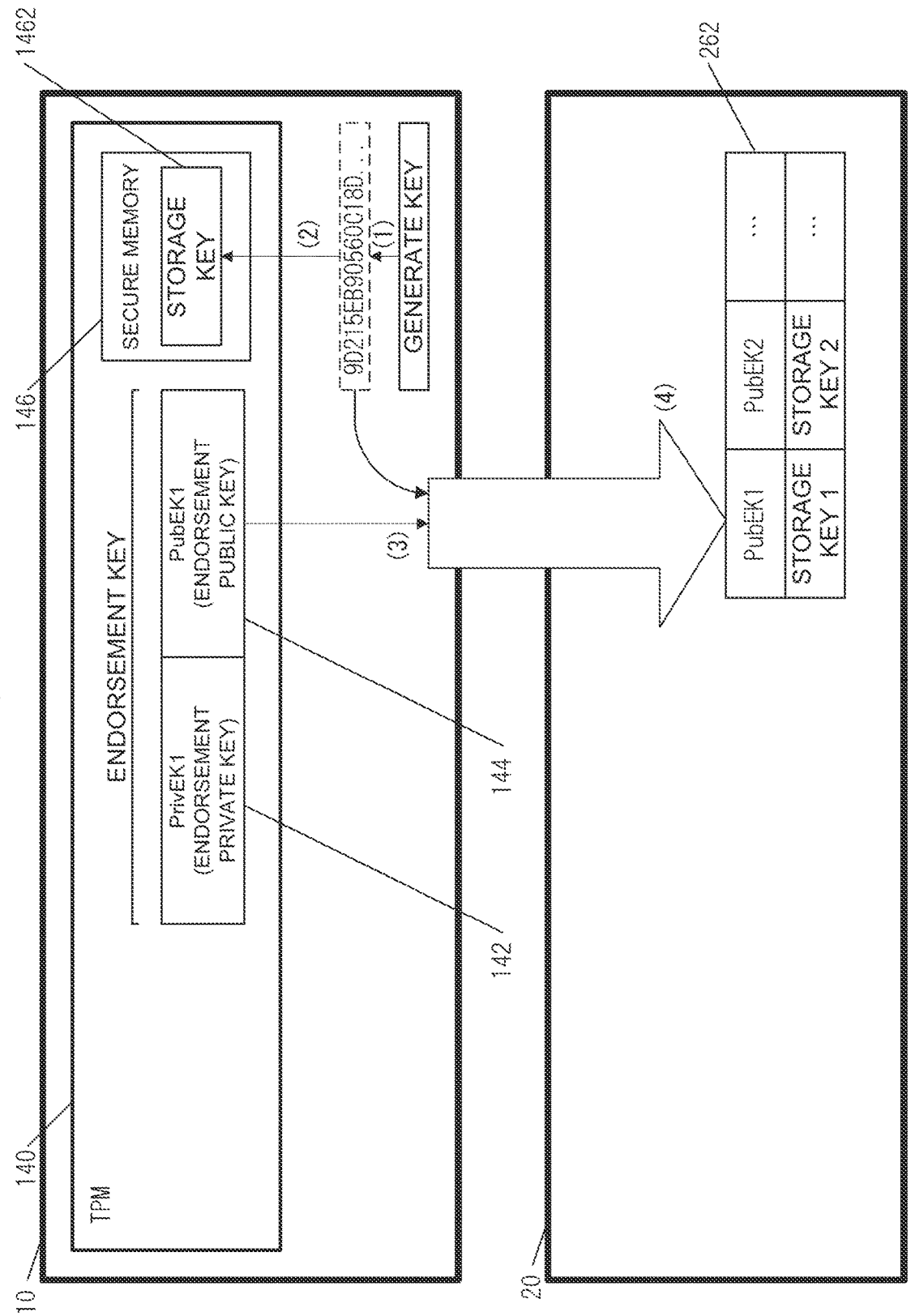
FIG. 12 is a diagram illustrating an operation example according to the first embodiment.

With reference to FIGS. 12 to 14, an operation example according to the present embodiment will be described. First, with reference to FIG. 12, the procedure to register the endorsement public key in the server device 20 by the information processing apparatus 10 will be described. First, the information processing apparatus 10 generates the storage key ((1) in FIG. 12). The storage key may be a password input by the user or a key generated using the password-based key derivation function based on the password. The storage key is stored as the storage key 1462 in the secure memory 146 of the TPM 140 ((2) in FIG. 12).

The information processing apparatus 10 registers the generated storage key in the server device 20. At this time, the information processing apparatus 10 sends, to the server device 20, PubEK1 that is the endorsement public key 144 and the storage key ((3) in FIG. 12). The server device 20 generates the storage key information including the storage key and the endorsement public key PubEK1 received and stores it in the storage key information storage area 262 ((4) in FIG. 12). The communication between the information processing apparatus 10 and the server device 20 may be protected by a measure such as Transport Layer Security (TLS). In this case, when starting the communication for registration, the information processing apparatus 10 verifies a digital certificate presented by the communication partner to confirm that the communication partner is the authentic server device 20. Therefore, the server device 20 previously stores the digital certificate.

1.4.2 Operation to Send and Receive Storage Key

With reference to FIG. 13, the operation to send and receive the storage key will be described. At first, the information processing apparatus 10 makes an inquiry to the server device 20 to obtain the storage key of the information processing apparatus 10. At this time, the information processing apparatus 10 sends, to the server device 20, PubEK1 that is the endorsement public key 144 ((1) in FIG. 13).

The server device 20 receives the inquiry and searches the storage key information storage area 262 ((2) in FIG. 13). Thus, the server device 20 acquires the storage key (search result) corresponding to PubEK1 received from the information processing apparatus 10 ((3) in FIG. 13).

The server device 20 adds the counter value to the storage key ((4) in FIG. 13). At this time, the server device 20 increments the counter value by 1 to update it. The server device 20 encrypts the counter value and the storage key using PubEK1 ((5) in FIG. 13) and replies the cipher text obtained by encryption to the information processing apparatus 10 ((6) in FIG. 13).

The information processing apparatus 10 causes the TPM 140 to decrypt the received reply so as to acquire the counter value and the storage key ((7) in FIG. 13). At this time, when the counter value acquired from the server device 20 is more than the counter value of the information processing apparatus 10, the information processing apparatus 10 adopts the reply and updates the counter value of the information processing apparatus 10 ((8) in FIG. 13). In this way, the information processing apparatus 10 may acquire the storage key without reading the secure memory 146 ((9) in FIG. 13).

1.4.3 Operation of Response to Replay Attack

The present embodiment is characterized in that the information processing apparatus 10 acquires the storage key from the server device 20 so as to omit the process of inputting the password at the time of startup and extracting the storage key from the TPM 140. Here, there is concern about eavesdropping on information sent from the server device 20 to the information processing apparatus 10 or "impersonation" attacks in which the attacker uses a fake apparatus different from the information processing apparatus 10 to acquire the information. Typically, techniques such as TLS are used to prevent such attacks. In this case, there is a need to introduce a digital certificate into the information processing apparatus 10 and present the digital certificate to the server device 20.

However, the storage key is needed before the information processing apparatus 10 starts up the operating system. It is difficult for the information processing apparatus 10 to use TLS, or the like, before the operating system is started up. Furthermore, there is the issue of the need to separately prepare the digital certificate, or the like, for the information processing apparatus 10.

Therefore, the information processing apparatus 10 according to the present embodiment uses the RSA key pair (endorsement key) of the TPM 140 as the key (key delivery key) for encrypting the storage key. Specifically, the information processing apparatus 10 decrypts the cipher text, which has been encrypted with the endorsement public key 144 of the information processing apparatus 10, from the server device 20 by using the endorsement private key 142 of the information processing apparatus 10. That is, the information processing apparatus 10 may use the endorsement public key before the operating system is started up. This allows the information processing apparatus 10 to communicate encrypted information with the server device 20 and ensure security. As a result, according to the present embodiment, the cipher text of the storage key may be sent and received simply, as compared with the case where the storage key is received by TLS.

According to the present embodiment, the cipher text sent from the server device 20 to the information processing apparatus 10 includes the counter value. This allows the information processing apparatus 10 to respond to replay attacks. Here, with reference to FIG. 14, the operation of the information processing apparatus 10 to respond to a replay attack will be described.

Figure 14A:
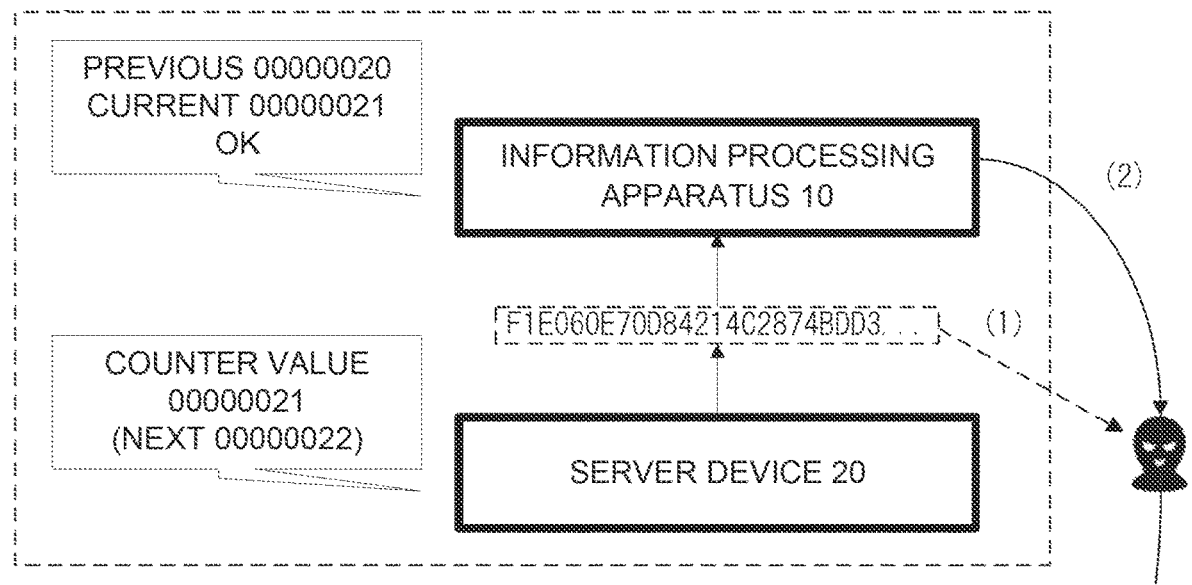
FIGS. 14A and 14B are diagrams illustrating an operation example according to the first embodiment.
Figure 14B:
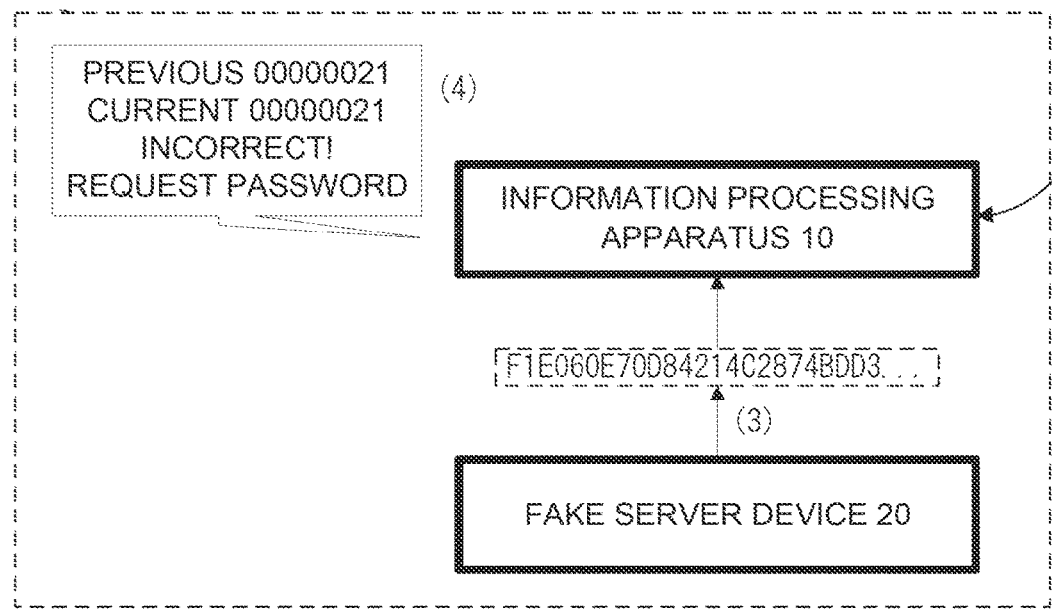

FIG. 14A illustrates an authorized operational environment, and FIG. 14B illustrates an attacker's environment (attacker's base). First, in the authorized operational environment, the information processing apparatus 10 whose counter value is "00000020" acquires the cipher text whose counter value is "00000021" from the server device 20. The information processing apparatus 10 determines that the counter value received from the server device 20 is appropriate and updates the counter value of the information processing apparatus 10 to "00000021".

Here, the attacker connects his/her PC to a network (LAN, etc.) in the authorized operational environment and eavesdrops on the reply from the server device 20 to the information processing apparatus 10 ((1) in FIG. 14). Further, the attacker steals the information processing apparatus 10 and installs it at the attacker's base ((2) in FIG. 14).

The attacker connects a fake key server to the information processing apparatus 10 to send the eavesdropped reply. In such an environment, the information processing apparatus 10 makes an inquiry to the fake key server for the storage key and receives a reply from the fake key server ((3) in FIG.

14). Here, the counter value included in the reply is "00000021". The counter value of the information processing apparatus 10 is "00000021". Here, the counter value from the authentic server device 20 is supposed to be more than the counter value of the information processing apparatus 10, but the counter value acquired from the fake key server is equal to or less than that, and therefore the information processing apparatus 10 determines that the counter value is not appropriate ((4) in FIG. 14). Thus, the information processing apparatus 10 recognizes that the reply is incorrect (replay attack=reuse of the past reply), does not accept the reply received from the fake key server, and requests password input. The attacker cannot steal information from the information processing apparatus 10 unless he or she knows the password.

Although some replay attack techniques use the current time, time synchronization (clock adjustment) is needed between the information processing apparatus 10 and the server device 20. Meanwhile, the information processing apparatus 10 according to the present embodiment uses the counter value to effectively prevent information leakage due to abuse outside the operational environment.

In the description according to the above embodiment, the secure memory 146 is protected with the password, and the controller 100 requests the user to input the password as authentication. However, authentication methods other than passwords may be used, for example, biometric authentication (fingerprint authentication, voice authentication, face authentication, etc.) and possession authentication using ID cards, portable terminal devices, etc., may be used, and typical authentication methods may be used.

Thus, the information processing apparatus according to the present embodiment may secure security for the storage and also increase the availability of the information processing apparatus by acquiring the storage key based on the password when the storage key is not acquirable from the server device. In particular, the information processing apparatus according to the present embodiment attempts to acquire the storage key from the key server (server device) when it is turned on (power-on), and when the storage key is acquirable, uses the storage key acquired from the server device to decrypt the storage and operates. This allows the information processing apparatus to eliminate the need for the user to input the password at the time of startup. As a result, the information processing apparatus according to the present embodiment may save users the trouble of inputting the password for storage protection in daily use and improve the user convenience. The information processing apparatus according to the present embodiment may eliminate the password input and thus may expect the effect of reducing security risks such as writing a storage protection password on a sticky note and pasting it. This is effective when the information processing apparatus is shared.

According to the present embodiment, when the storage key is sent from the server device, encryption is executed with the endorsement public key of the information processing apparatus. As the storage key is typically needed to start up the operating system, the storage key needs to be sent securely before the operating system is started up. In order to perform cryptographic communication such as TLS before the operating system is started up, the mechanism (boot process) for starting up the apparatus needs to include the same cryptographic communication mechanism as that of the operating system, which causes a heavy burden on the design of the apparatus, the number of components, and the time and effort for management by the user. However, according to the present embodiment, the storage key is sent and received by encryption with the endorsement public key without the need of TLS, etc.

When the storage key is not acquirable from the server device, the information processing apparatus according to the present embodiment acquires the storage key by password input and thus may prepare for network troubles, which maintains the availability of the apparatus. Even when the storage key is not acquirable due to, for example, failures of the network (LAN, etc.) or the server device or changes in the functional configuration, the information processing apparatus according to the present embodiment may decrypt the storage. Here, the storage key is stored in the secure memory that is strictly managed in the information processing apparatus, and therefore the information processing apparatus according to the present embodiment may securely acquire the storage key.

The information processing apparatus according to the present embodiment stores the storage key in the secure memory and thus makes it difficult to read the storage key and further uses the counter value to verify the information received from the server device. This allows the information processing apparatus to prevent information leakage and protect confidentiality even in the case of theft.

2. Second Embodiment

Next, a second embodiment will be described. The second embodiment is different from the first embodiment in that, instead of storing the storage key in the secure memory, the storage key is stored in an external storage medium. A point different from the first embodiment will be primarily described.

According to the present embodiment, the connector 130 of the information processing apparatus 10 is connected to an external storage medium that stores the storage key. At Step S160 of FIG. 10, the controller 100 acquires the storage key from the external storage medium connected to the connector 130. In the description below, it is assumed that the external storage medium storing the storage key is a USB memory.

Here, when the USB memory stores the storage key and both the information processing apparatus 10 and the USB memory are stolen by someone other than the authorized user, there is a need to prevent abuse. Therefore, according to the present embodiment, the method below is implemented so that the information processing apparatus 10 may securely acquire the storage key from the USB memory.

(1) Method for Encrypting and Storing Storage Key in USB Memory

The method for encrypting and storing the storage key in the USB memory is to store the encrypted storage key in the USB memory, cause the information processing apparatus 10, which has acquired the encrypted storage key, to decrypt the storage key, and thus acquire the storage key. For example, the secure memory 146 of the TPM 140 stores the encryption key (key encryption key) for decrypting the storage key. In this case, at Step S140, the controller 100 requests the password of the TPM 140 (the password for the secure memory 146) from the user. At this time, when the user has input the correct password, the controller 100 extracts the key encryption key from the TPM 140 (the secure memory 146). The controller 100 reads the encrypted storage key from the USB memory and uses the key encryption key to decrypt the encrypted storage key. The key encryption key may be generated by a measure (password-based key derivation function) for generating the key encryption key from the password. In this case, at Step S140, the controller 100 may request the password input when the key encryption key was generated from the user and, when the correct password is input, decrypt the storage key by using the key encryption key.

(2) Method of Using USB Memory Having Built-In Encryption Function

The method of using the USB memory having the built-in encryption function is, for example, the method using a type of USB memory to run the attached application program on the host (the information processing apparatus 10) side and receive the password input. It is also possible to use a type of USB memory including a numeric keypad for inputting a passcode or a type of USB memory including a fingerprint sensor for fingerprint authentication. After the encryption is decrypted in such a USB memory having a built-in encryption function, the controller 100 acquires the storage key stored in the USB memory at Step S140.

Figure 15A:
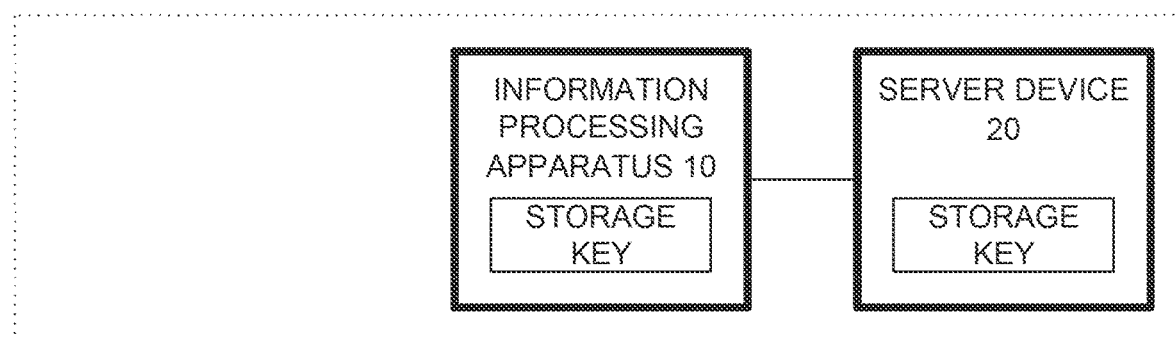
FIGS. 15A and 15B are diagrams illustrating the comparison between operations according to the first embodiment and a second embodiment.
Figure 15B:
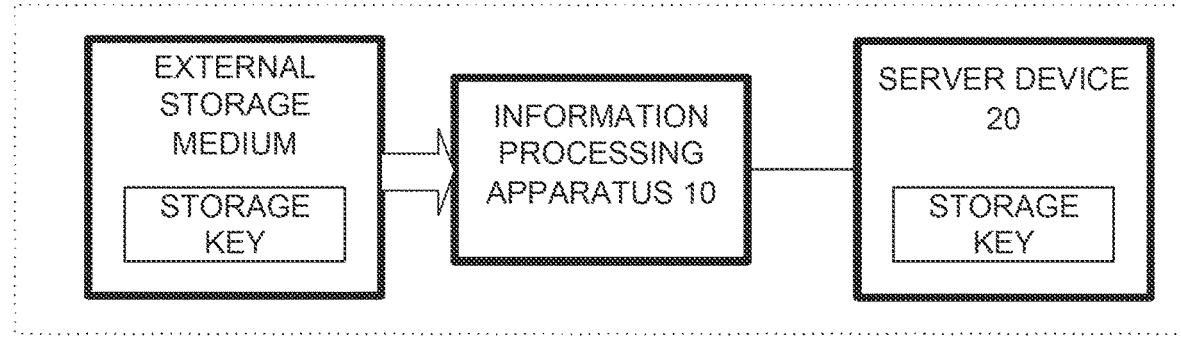

FIGS. 15A and 15B are diagrams illustrating a difference between the first embodiment and the present embodiment. FIG. 15A is a diagram illustrating the operation according to the first embodiment, where the information processing apparatus 10 and the server device 20 store the storage keys. FIG. 15B is a diagram illustrating the operation according to the present embodiment, where the external storage medium and the server device 20 store the storage keys. When the storage key is not acquirable from the server device 20, the information processing apparatus 10 according to the present embodiment acquires the storage key from the external storage medium.

At Step S160 in FIG. 10, the controller 100 determines whether the secure memory 146 stores the storage key 1462 and, when the secure memory 146 does not store the storage key 1462, may acquire the storage key from the external storage device.

In the above description, the external storage medium is a USB memory, but the external storage medium may be any device capable of securely exchanging data with the information processing apparatus 10. For example, the external storage device may also be a hard disk, SD card, or the like, which may prevent information leakage. The external storage device may also be connected via a short-range wireless communication such as Bluetooth (registered trademark).

As described above, the information processing apparatus according to the present embodiment may acquire the storage key from the external storage medium. By applying measures to the external storage medium to prevent abuse, the information processing apparatus may securely acquire the encryption key even when the storage key is not stored in the security module and the encryption key is not acquirable from the server device.

3. Third Embodiment

Next, a third embodiment will be described. The third embodiment is different from the first embodiment in that the storage key is stored in a terminal device (e.g., mobile terminal) instead of being stored in the secure memory. A point different from the first embodiment will be primarily described.

According to the present embodiment, the connector 130 of the information processing apparatus 10 is connected to a terminal device that stores the storage key. At Step S160 of FIG. 10, the controller 100 acquires the storage key from the terminal device connected to the connector 130.

Here, when the terminal device, which stores the storage key of the information processing apparatus 10, is properly protected from abuse by anyone other than the authorized user, the terminal device may behave in the same manner as the server device 20. In this case, the terminal device stores the endorsement public key and the storage key in association with each other. At Step S160 of FIG. 10, the controller 100 sends the endorsement public key 144 to the terminal device. The terminal device sends the storage key 1462 corresponding to the received endorsement public key 144 to the information processing apparatus 10. This allows the information processing apparatus 10 to acquire the storage key 1462 from the terminal device. The case of being properly protected refers to the case where, when the terminal device is used, the input of the password is requested or authentication such as biometric authentication is executed.

On the other hand, when there is a risk of abuse of the terminal device by someone other than the authorized user, the same behavior as the server device 20 is not sufficient. In such a case, the password is input to the terminal device when the storage key is acquired by the information processing apparatus 10.

The password input to the terminal device may be the password of the TPM 140, which is set for the TPM 140, may be a password other than the password of the TPM 140, or may be a combination of both (in this case, both passwords need to be input). Inputting the password of the TPM 140 and the password other than the password of the TPM 140 is effective when there is a need to increase the security strength for the acquisition of the storage key.

Figure 16A:
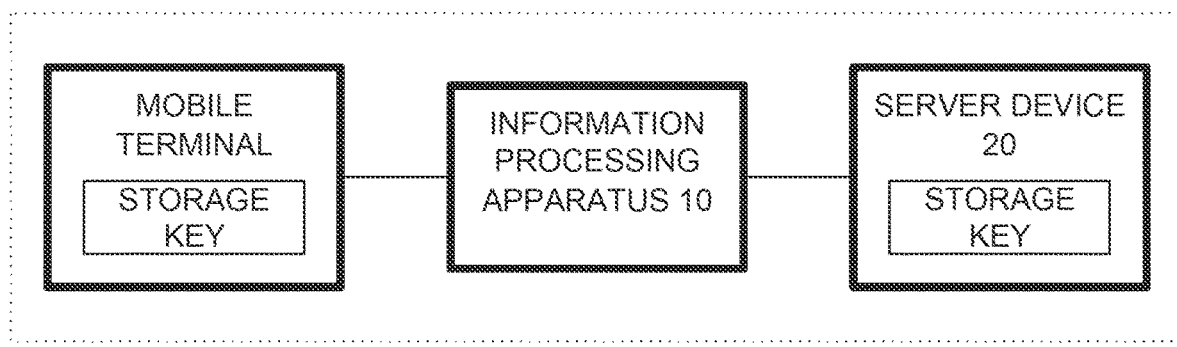
FIGS. 16A and 16B are diagrams illustrating an operation example according to a third embodiment.

FIG. 16A is a diagram illustrating an operation example according to the present embodiment. The mobile terminal (terminal device) and the server device 20 store the storage key. When the storage key is not acquirable from the server device 20, the information processing apparatus 10 according to the present embodiment acquires the storage key from the mobile device.

At Step S160 of FIG. 10, the controller 100 may determine whether the secure memory 146 stores the storage key 1462 and, when the secure memory 146 does not store the storage key 1462, acquire the storage key from the terminal device.

Figure 16B:
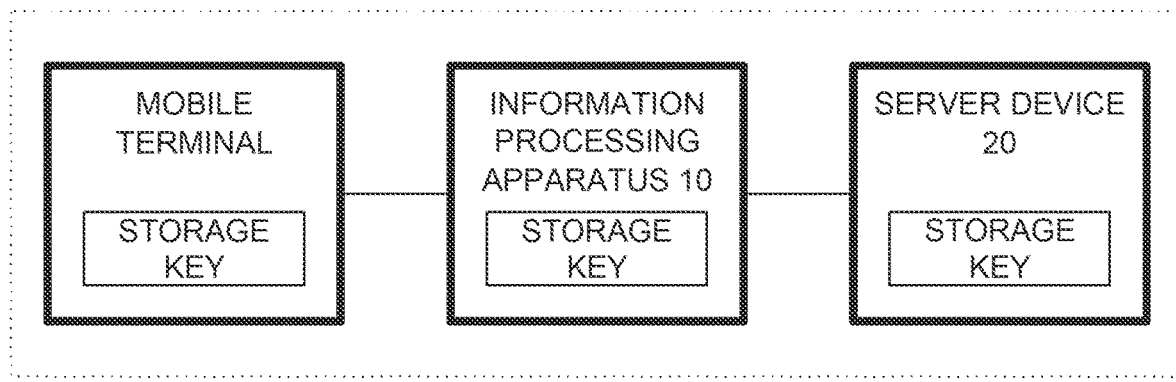

As illustrated in FIG. 16B, the TPM 140 and the mobile terminal may store the storage key, and the TPM 140 and the mobile terminal may be used in combination. For example, it is assumed that there are a first administrator (e.g., primary administrator) and a second administrator (e.g., sub-administrator) as users who have a role in starting up the information processing apparatus 10. The primary administrator manages the password of the TPM 140 in the information processing apparatus 10. When the server device 20 is not available, the primary administrator inputs the password of the TPM 140 to start up the information processing apparatus. The sub-administrator manages the mobile device that stores the storage key. When the server device 20 is unavailable and the primary administrator is not present, the sub-administrator uses the mobile terminal to start up the apparatus.

As described above, the information processing apparatus according to the present embodiment may acquire the storage key from the terminal device connected to the information processing apparatus. In this case, as compared with the case where the information processing apparatus or the USB memory stores the storage key, when the terminal device stores the storage key, the password other than the password of the TPM is also needed so that security may be enhanced. Thus, the security level may be set in accordance with the storage location of the storage key. The user may flexibly set the storage location and the security level of the storage key in accordance with the manner of operation of the information processing apparatus. Even when the encryption key is not acquirable from the server device, the image processing apparatus may securely acquire the encryption key from the terminal device.

4. Fourth Embodiment

Next, a fourth embodiment will be described. According to the fourth embodiment, the information processing apparatus described according to the first embodiment is applied to an image processing apparatus and, even when it is difficult to decrypt the storage, a predetermined function is provided to the user. According to the present embodiment, FIG. 2 of the first embodiment is replaced with FIG. 18. The same functional unit is denoted by the same reference numeral, and the description thereof is omitted.

4.1 Functional Configuration

Figure 17:
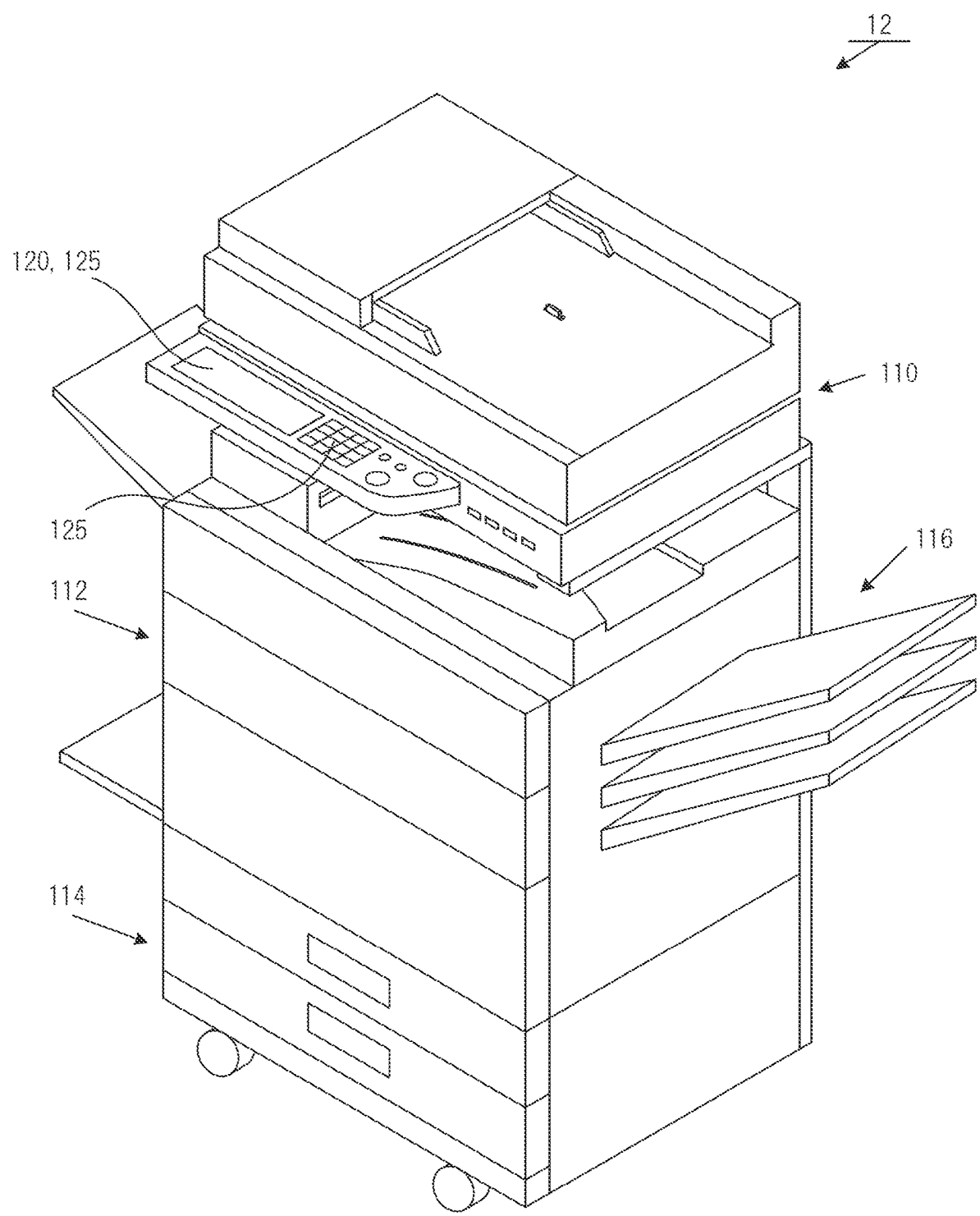
FIG. 17 is an external perspective view of an image processing apparatus according to a fourth embodiment.
Figure 18:
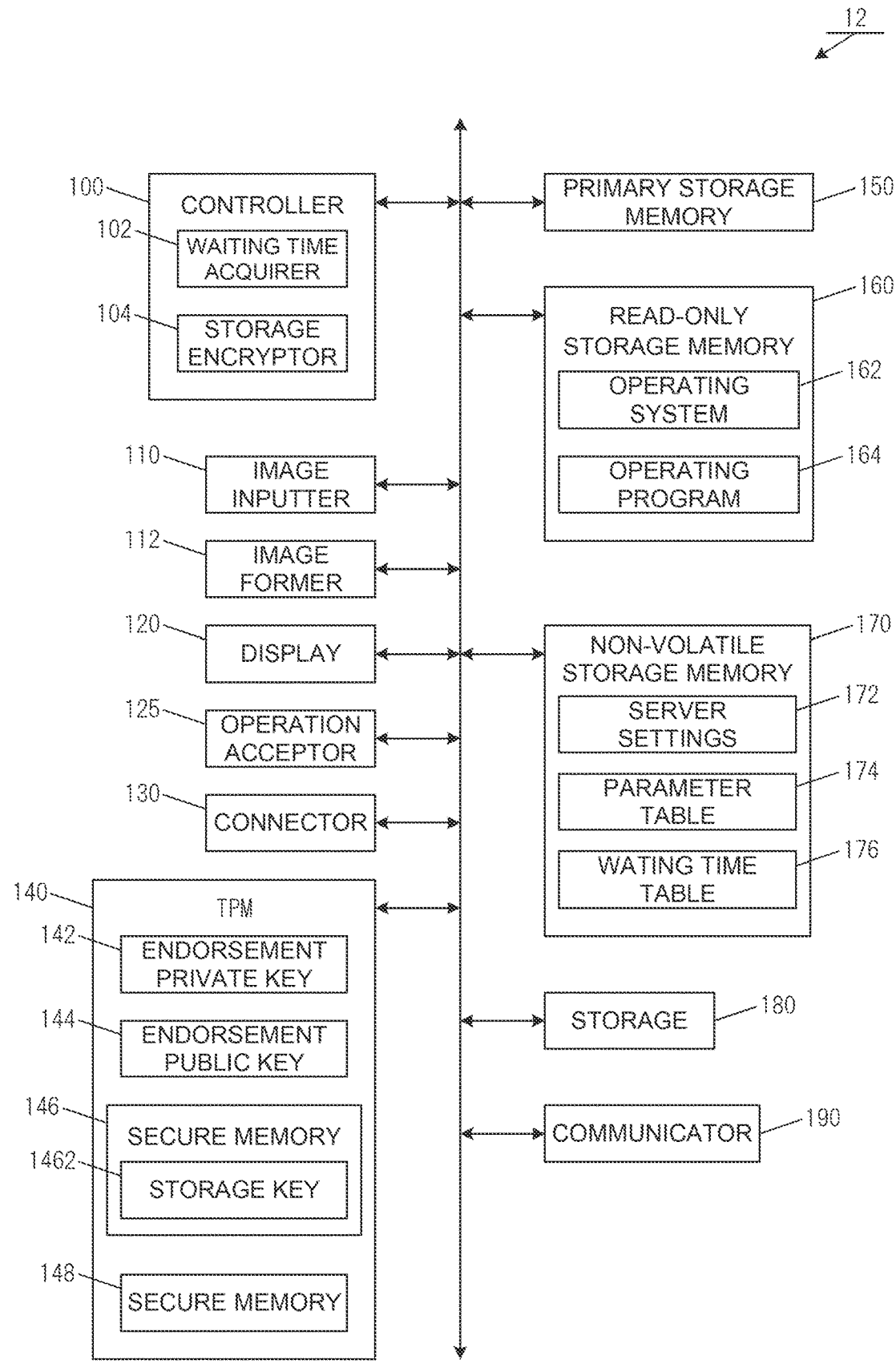
FIG. 18 is a diagram illustrating a functional configuration of the image processing apparatus according to the fourth embodiment.

A functional configuration of an image processing apparatus 12 according to the present embodiment will be described with reference to FIGS. 17 and 18. FIG. 17 is an external perspective view of the image processing apparatus 12, and FIG. 18 is a functional configuration diagram of the image processing apparatus 12. The image processing apparatus 12 is an apparatus that has a copy function, a print function, a scan function, an e-mail sending function, and the like, and that is generally called a digital multifunction peripheral. The image processing apparatus 12 may also be an image-forming apparatus including an image former that forms images on a recording sheet such as paper or OHP film by using a system such as an electrophotographic system.

The image processing apparatus 12 further includes an image inputter 110 and an image former 112 in addition to the information processing apparatus 10 according to the first embodiment.

The image inputter 110 is a functional unit that reads the image of a document and generates image data. For example, the image inputter 110 includes a scanner device, or the like, which converts images into electrical signals with an image sensor such as a charge coupled device (CCD) or a contact image sensor (CIS) and quantizes and encodes the electrical signals to generate digital data.

The image former 112 is a functional unit that forms image data on a recording medium (e.g., recording sheet). For example, the image former 112 feeds the recording sheet from a paper feed tray 114 in FIG. 17, forms an image on the surface of the recording sheet, and discharges the recording sheet having the image formed thereon from a paper discharge tray 116. The image former 112 includes a laser printer, or the like, which uses for example an electrophotographic system.

The operation acceptor 125 according to the present embodiment may include hardware keys (e.g., numeric keypad), buttons, etc. The image processing apparatus 12 may include a touch panel in which the display 120 and the operation acceptor 125 are integrally formed. The method for detecting an input on the touch panel may be any typical detection method such as a resistive method, an infrared method, an electromagnetic induction method, and a capacitive method.

According to the present embodiment, the read-only storage memory 160 stores an operating system 162 and an operating program 164. The operating program 164 is a program executed to operate each function of the image processing apparatus 12. The image processing apparatus 12 does not store the operating system in the storage 180.

4.2 Process Flow

Figure 19:
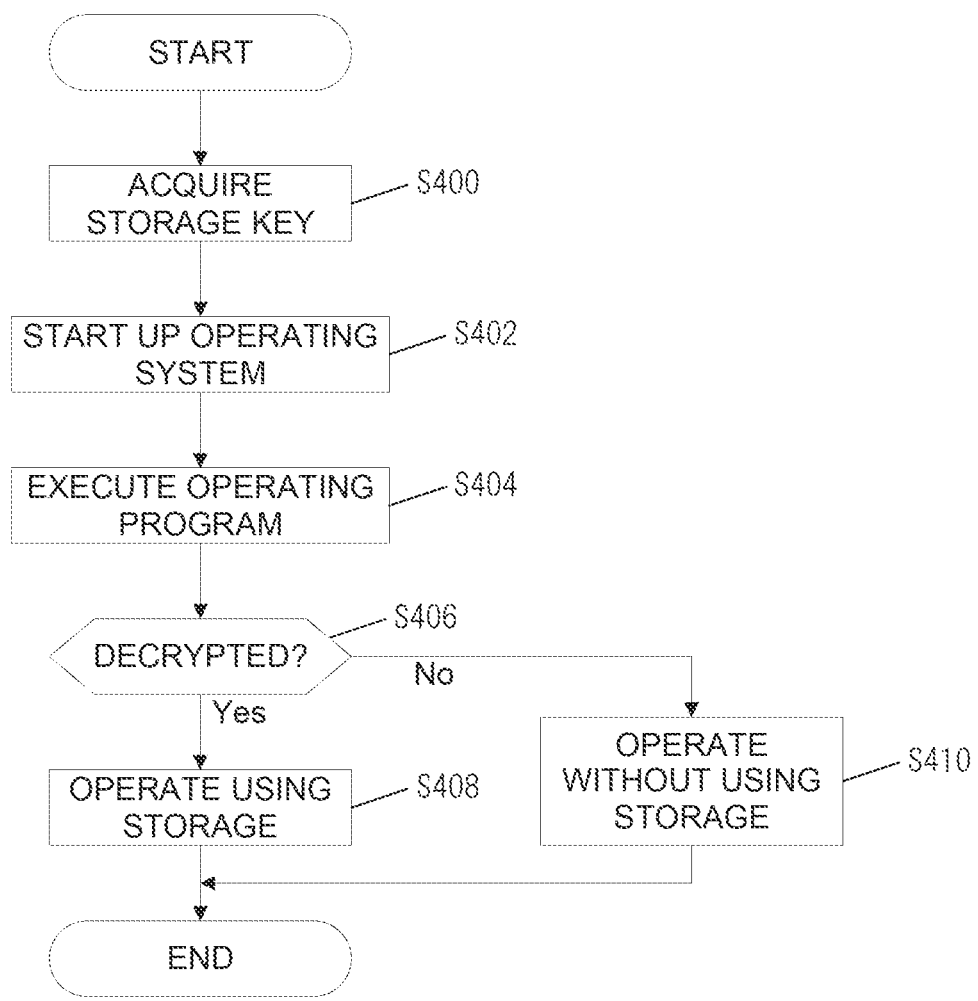
FIG. 19 is a flowchart illustrating a flow of a primary process of the image processing apparatus according to the fourth embodiment.

With reference to FIG. 19, the flow of the primary process executed by the image processing apparatus 12 will be described. The process illustrated in FIG. 19 is performed when the controller 100 of the image processing apparatus 12 reads the operating program 164 stored in the read-only storage memory 160.

First, the controller 100 acquires the storage key of the storage 180 (Step S400). As the process at Step S400, the controller 100 performs the process from FIGS. 8 to 10 according to the first embodiment. Here, when the correct password is not input a predetermined number of times during the process illustrated in FIG. 10, the controller 100 determines that the storage 180 could not be restored and terminates the process from FIGS. 8 to 10 according to the first embodiment. The controller 100 omits the process at Step S116 of FIG. 8 and Step S164 of FIG. 10.

Subsequently, the controller 100 reads and executes the operating system 162 stored in the read-only storage memory 160 to start up the operating system 162 (Step S402). The controller 100 reads and executes the operating program 164 to enable execution of the copy function, scan function, and the like (Step S404).

Subsequently, the controller 100 determines whether the storage 180 has been decrypted (Step S406). When the storage 180 has been decrypted, the controller 100 uses the storage 180 to operate the image processing apparatus 12 (Step S406; Yes→Step S408). In this case, for example, the controller 100 does not set a limit on the number of images to be input via the image inputter 110, but allows multiple pages to be copied or scanned. That is, the image processing apparatus 12 performs the normal operation.

Conversely, when the storage 180 has not been decrypted, the controller 100 operates the image processing apparatus 12 without using the storage 180 (Step S406; No→Step S410). In this case, for example, the controller 100 stores the data on the image input via the image inputter 110 in the primary storage memory 150 and executes copying or scanning based on the data stored in the primary storage memory 150. Therefore, the controller 100 limits the number of images to be input via the image inputter 110 to the number of images that may be stored in the primary storage memory 150. In this case, the controller 100 may limit the number of images that may be input at one time to 1 so as to allow a single page to be copied or scanned. The size of the data stored in the primary storage memory 150 may be reduced by limiting the resolution and quality of the image to be read. This causes a reduction in the number of images and the quality of the images formed (output) via the image former 112 in the copy function as compared with the normal case. This also causes, as compared with the normal case, a reduction in the number of images and the quality of images stored in an external storage device or sent to an external unit.

As described above, the image processing apparatus according to the present embodiment may switch the operational method of the image processing apparatus depending on whether the storage has been decrypted. At this time, even when the storage could not be decrypted, the image processing apparatus may enable the operation of a predetermined function and ensure the user convenience.

5. Modification

The present disclosure is not limited to the above-described embodiments, and various modifications are possible. Specifically, the technical scope of the present disclosure also includes embodiments obtained by combining technical measures modified as appropriate without departing from the scope of the present disclosure. For example, in the description according to the embodiments above, it is assumed that the apparatus that acquires the storage key from the server device is the information processing apparatus or the image processing apparatus, but the apparatus may also be a server or a virtual machine.

Although some parts of the above embodiments have been described individually for convenience of explanation, it is needless to say that the embodiments may be implemented in combination within the technically possible range. For example, the second embodiment and the fourth embodiment may be combined. In this case, when the storage key is not acquirable from the server device, the image processing apparatus acquires the storage key stored in an external storage medium.

The program operating in each apparatus according to the embodiment is a program that controls the CPU, and the like (the program that causes the computer to function) to perform the function according to the above-described embodiment. The information handled by these apparatuses is temporarily stored in a temporary storage device (e.g., RAM) during its processing, and then stored in various storage devices such as a read only memory (ROM) or an HDD, and is read, modified, and written by the CPU as needed.

Here, recording media that store the program may be any of semiconductor media (e.g., ROMs and non-volatile memory cards), optical recording media and magneto-optical recording media (e.g., digital versatile disc (DVD), magneto optical disc (MO), Mini Disc (MD), Compact Disc (CD), Blu-ray (registered trademark) Disc (BD) and the like), magnetic recording media (e.g., magnetic tapes and flexible disks), etc. The function according to the above embodiment may be performed by executing the loaded program, and also the function according to the present disclosure may be performed by processing in conjunction with the operating system or other application programs, or the like, based on an instruction of the program.

For distribution in the market, the program may be stored and distributed in a portable recording medium or transferred to a server computer connected via a network such as the Internet. In this case, it is obvious that the present disclosure also includes a storage device of the server computer.

What is claimed is:

1. An information processing apparatus comprising:
   a first storage memory that stores data;
   a second storage memory that stores an encryption key;
   a controller that encrypts the first storage memory with the encryption key; and
   a communicator that communicates with a server device that stores the encryption key, wherein when the encryption key is acquirable from the server device via the communicator, the controller uses the encryption key acquired from the server device to decrypt the first storage memory, and
   when the encryption key is not acquirable from the server device via the communicator, the controller requests authentication and,
   after the authentication is performed, acquires the encryption key from the second storage memory and decrypts the first storage memory;
   wherein the second storage memory is protected by a Trusted Platform Module (TPM);
   wherein the controller receives, from the server device, the encryption key encrypted with a public key embedded in the TPM, and decrypts the encrypted encryption key with a private key embedded in the TPM;
   wherein the controller acquires a counter value together with the encryption key from the server device, and when the counter value acquired from the server device is not appropriate, determines that the encryption key is not acquirable from the server device.

2. The information processing apparatus according to claim 1, wherein the authentication is a password set in the second storage memory.

3. The information processing apparatus according to claim 1, wherein, when the second storage memory does not store the encryption key, the controller acquires the encryption key from another device connected.

4. The information processing apparatus according to claim 1, wherein the controller acquires the encryption key from the server device after power is turned on and before an operating system is started up.

5. The information processing apparatus according to claim 1, wherein the controller
   operates by using the first storage memory when the first storage memory was decrypted, and
   operates without using the first storage memory when the authentication was not performed.

6. The information processing apparatus according to claim 5, further comprising an image inputter that inputs an image of a document, wherein
   the controller limits images input by the image inputter when operating without using the first storage memory.

7. A control method for an apparatus including a first storage memory that stores data and a second storage memory that stores an encryption key, the control method comprising:
   encrypting the first storage memory with the encryption key via a controller;
   communicating with a server device that stores the encryption key; and
   when the encryption key is acquirable from the server device, using the encryption key acquired from the server device to decrypt the first storage memory and,
   when the encryption key is not acquirable from the server device, requesting authentication and,
   after the authentication is performed, acquiring the encryption key from the second storage memory and decrypting the first storage memory;
   wherein the second storage memory is protected by a Trusted Platform Module (TPM);
   wherein the controller receives, from the server device, the encryption key encrypted with a public key embedded in the TPM, and decrypts the encrypted encryption key with a private key embedded in the TPM;
   wherein the controller acquires a counter value together with the encryption key from the server device, and when the counter value acquired from the server device is not appropriate, determines that the encryption key is not acquirable from the server device.

* * * * *